(12) United States Patent
Cabral

(10) Patent No.: US 9,808,041 B2
(45) Date of Patent: Nov. 7, 2017

(54) CAP OR SIMILAR HEADWEAR HAVING LUMINOUS MEANS INCORPORATED IN THE DECORATIVE AND/OR IN THE PROMOTIONAL ELEMENTS

(71) Applicant: Edson Ubirajara Cabral, Aruja (BR)

(72) Inventor: Edson Ubirajara Cabral, Aruja (BR)

(*) Notice: Subject to any disclaimer, the term of this patent is extended or adjusted under 35 U.S.C. 154(b) by 0 days.

(21) Appl. No.: 15/049,675

(22) Filed: Feb. 22, 2016

(65) Prior Publication Data

US 2016/0242482 A1     Aug. 25, 2016

(30) Foreign Application Priority Data

Feb. 24, 2015 (BR) .................. BR102015003925

(51) Int. Cl.

| | | |
|---|---|---|
| *F21V 21/084* | (2006.01) | |
| *A42B 1/24* | (2006.01) | |
| *F21V 8/00* | (2006.01) | |
| *F21V 33/00* | (2006.01) | |
| *F21S 9/02* | (2006.01) | |
| *F21W 121/06* | (2006.01) | |
| *F21Y 115/10* | (2016.01) | |

(52) U.S. Cl.
CPC .............. *A42B 1/244* (2013.01); *A42B 1/248* (2013.01); *F21V 33/0008* (2013.01); *G02B 6/0008* (2013.01); *F21S 9/02* (2013.01); *F21W 2121/06* (2013.01); *F21Y 2115/10* (2016.08)

(58) Field of Classification Search
CPC ...... A42B 1/244; A42B 3/044; G02B 23/125; G02B 27/017

USPC .......................................... 362/106
See application file for complete search history.

(56) References Cited

U.S. PATENT DOCUMENTS

| | | | |
|---|---|---|---|
| 5,741,060 A | 4/1998 | Johnson | |
| 6,721,962 B1 | 4/2004 | Polaire | |
| 7,086,749 B1 | 8/2006 | Hanley | |
| 2014/0270685 A1* | 9/2014 | Letke | A42B 1/244 386/224 |

FOREIGN PATENT DOCUMENTS

BR      PI 9605784-0 A      8/1998

OTHER PUBLICATIONS

Translation of Brazilian Patent Application No. PI 9605784-0 A filed on Nov. 27, 1996 with a publication date of Aug. 25, 1998; Inventor: Eduardo Henrique de Melo Lima.

* cited by examiner

*Primary Examiner* — Jamara Franklin
(74) *Attorney, Agent, or Firm* — Nilay J. Choksi; Smith & Hopen, P.A.

(57) ABSTRACT

Improvements introduced in a cap or a similar headwear provided with a luminous means incorporated in the decorative and/or in the promotional elements. The instant invention is related to a cap (B) formed by a crown (cp) and a brim (ab) whose outer surfaces may be provided with decorative elements (ED) such as logos, figures, inscriptions and others, such decorative element (ED) may comprise an embroidery, silk-screen, metallic plates and other types of decoration that are provided together with luminous means (1).

4 Claims, 5 Drawing Sheets

CAP OR SIMILAR HEADWEAR HAVING LUMINOUS MEANS INCORPORATED IN THE DECORATIVE AND/OR IN THE PROMOTIONAL ELEMENTS

CROSS-REFERENCE TO RELATED APPLICATIONS

This nonprovisional patent application claims priority to Brazilian Patent Application No. BR102015003925-5, filed Feb. 24, 2015 by the same inventor.

FIELD OF THE INVENTION

This instant invention is related to some improvements introduced in cap or similar headwear having luminous means incorporated in the decorative or promotional elements of the cap such as logos, figures, inscriptions and other kind of promotional items. Such decorative elements may be some as embroidery, serigraphy, metallic plates, to name a few, and outstandingly incorporate at least one luminous mean which might be made of optical fiber filaments, LED (light emitting diodes), neon and others, each one of such means being fed by one or more 3.5 v or 12 v batteries. Such batteries are activated by a switch bottom placed right on a cap brim or any other suitable site. Said luminous means are incorporated to said decorative and/or promotional elements and act as a visual highlighted feature of a cap or headwear.

BACKGROUND OF THE INVENTION

It is well known that caps are versatile accessories since they can be used both as a protection against sunrays while one practices a physical activity and as a means to make up a visual identity by a different style of accessory. Yet, rather they can be used by individuals of all gender and ages.

Typically, caps are formed by a crown and from the front of such crown a brim or something like a beak extends forward on. Diametrically, at the opposite side of said brim an aperture exists so that a regulating device is provided therein having closure means such as buckles, pressure bottoms, VELCRO® type closures or another types of closing devices.

Currently several types of caps are available in the market and they differ from one another in the dimension of their crown and/or dimension of their brim such as a cap having a crown somewhat more rounded and a brim which is stylistically cut to look as a baseball-styled cap or a rap-styled cap with a wider and squared crown having a larger and rectilinear brim.

Said caps or headwear might also be provided with marketing decorative elements so as to market trademarks, brands, events and some other kind of similar propaganda; yet, said caps might also divulge logos of sport clubs, flags of countries, several logos of institutions and some other types of propaganda. Additionally, they might bear personalized decorative elements aimed at identifying the user of said caps.

Generally considering, said decorative elements in caps might be provided embossed, might be manufactured as embroideries which are applied along the surface of the crown or along the brim and even might be provided as serigraphy painting or additionally might be provided as metal plaques made with graphical inscriptions or laces or any other types.

A few types of caps bear decorative elements provided with images as holographic engravings such that some movements are made based in reflection and thus causing an enhanced appearance to the user of such caps.

Yet another currently updated type of cap as a decorative element is that particular one which is provided with a tube similar to neon attached to the edge of the brim. Such tube made in the shape of a plastic stick filled with chemical solutions which simulate lightening by means of chemiluminescence when they are stirred up. However, this ornament has a short duration.

Despite of having an attractive element provided with the caps such types of caps found in the prior art do not have said attractive element added to the decorative element and such circumstance make such caps of the prior art somewhat distinct from the subject-matter that is now claimed as an invention.

BRIEF DESCRIPTION OF THE RELATED ART

Searches carried out in specialized database brought in forward patent documents related to caps, hats or other types of similar headwear provided with luminous means. One of such documents is a U.S. Pat. No. 5,741,060 related to a type of baseball cap including a luminous means for a user who has unoccupied hands. Combination of brim with a set of lights is aimed at not changing the normal aesthetic appearance of the baseball cap and further to provide a source of light relatively strong to focus toward the vision field of a cap user.

U.S. Pat. No. 7,086,749 taught a lightening device fastened to the front portion of lower edge in the brim. Said device comprises a matrix of contiguous light having emitting diodes (LEDs) and said device lies totally inside the fabric covering the brim of said cap and such matrix of light is located close to said brim. Electrical power is supplied by a feeding source to the source of light and both are connected to one another by means of an electric wire thus allowing electric power to run there-through.

U.S. Pat. No. 6,721,962 taught a baseball-styled lightened cap having a light incorporated in the brim and is substantially hidden inside said brim. In an embodiment of the invention the power source includes a solar panel which is located over the rim.

Patent no. BR PI9605784 taught a system of lightening effects in hats, caps, eyeshade, beret and similar headwear which combines a function of general propaganda, entertainment and signaling device thus able to draw more attention by means of visual effects and as a consequence an enhanced manner of delivering propaganda targeted to or achieving an enhanced signalization. The lightening effect is based on LEDs, on small acrylic plaques or similar plaques, LED matrix and other means. A kind of dark hose is also provided aiming at achieving an enhanced visualization of the lightening effects inside clearer environments. An electronic circuit is also provided and made up of a counting device, timer, capacitors, resistors, potentiometers and a small battery.

In spite of said inventions teaching luminous means applied to caps, hats and similar headwear said means are complex or have distinct constructions from those taught in this instant subject-matter now claimed as invention mainly for the luminous means being contemplated with supply of light incorporated to decorative and/or promotional elements and additionally for having innovative technical features.

BRIEF SUMMARY OF THE INVENTION

Seeking to bring improvements to the consumer market the applicant developed improvements introduced to caps and similar headwear provided with luminous means incorporated into decorative or promotional elements such as logos, figures, inscriptions and so on. Said decorative element might be in the form of embroidery, silk-screen, metallic plates and others. Said luminous means are made of multiples filaments of optical fiber associated with a light issued from separated LEDs or a string of LEDs, LED chips or the like and, occasionally there might be an application of neon tubes.

Said luminous means are connected to an electrical circuit that is formed by a printed circuit board and a feeding battery having a command box. A switch bottom might be located at the command box or at any other site in the cap that is easily accessible by the cap user, e.g., disguisedly located at lower surface of the brim so as not to intervene in the aesthetic appearance of the cap. Such a switch bottom might be provided with varied commands such as a single mode of a constant lightening or distinct modes of lightening such as rapid strobe mode or slow strobe mode and other fashions.

Electrical wires, electrical circuit and power source are located in the inner portions of crown in a site not to intervene at the moment the cap user puts the cap on head. On their turn, luminous means in the form of a set of filaments made of optical fiber and LED are located at the inner portion of the cap or at the lower surface in the brim in such a way to reach the decorative elements that are applied at the outer portion of the cap, thus being such luminous means incorporated to said decorative means when said decorative means are manufactured. Inner portion of the crown where lightening components are spread is protected by a foam cloth or something alike partially attached at the edge crown in such a way to provide some comfort to the cap user.

As for the battery and the command box they are preferably located close to edge of cap crown and especially at the inner peripheral brim. Said components are coupled to an elastic ring that makes safe the act of putting on and putting off the cap from user's head.

Thus at the time when a single or multiple LEDs are turned on by means of a switch bottom a bunch of optical fibers surprisingly produces a lightening effect in the decorative and/or promotional elements that are located at the cap crown and/or at the cap brim since the ends of the optical fiber filaments are incorporated to such decorative elements thus providing a distinct look to this particular cap as compared to those caps available at the market.

BRIEF DESCRIPTION OF THE DRAWINGS

In order to complement this current description so as to obtain a better understanding of the features in this present invention, and in accordance with a preferred and practical mode of the invention, a set of drawings is attached herewith where, in an exemplified manner, although not to limit, the invention carried out.

DETAILED DESCRIPTION OF THE PREFERRED EMBODIMENT

Figure 1:
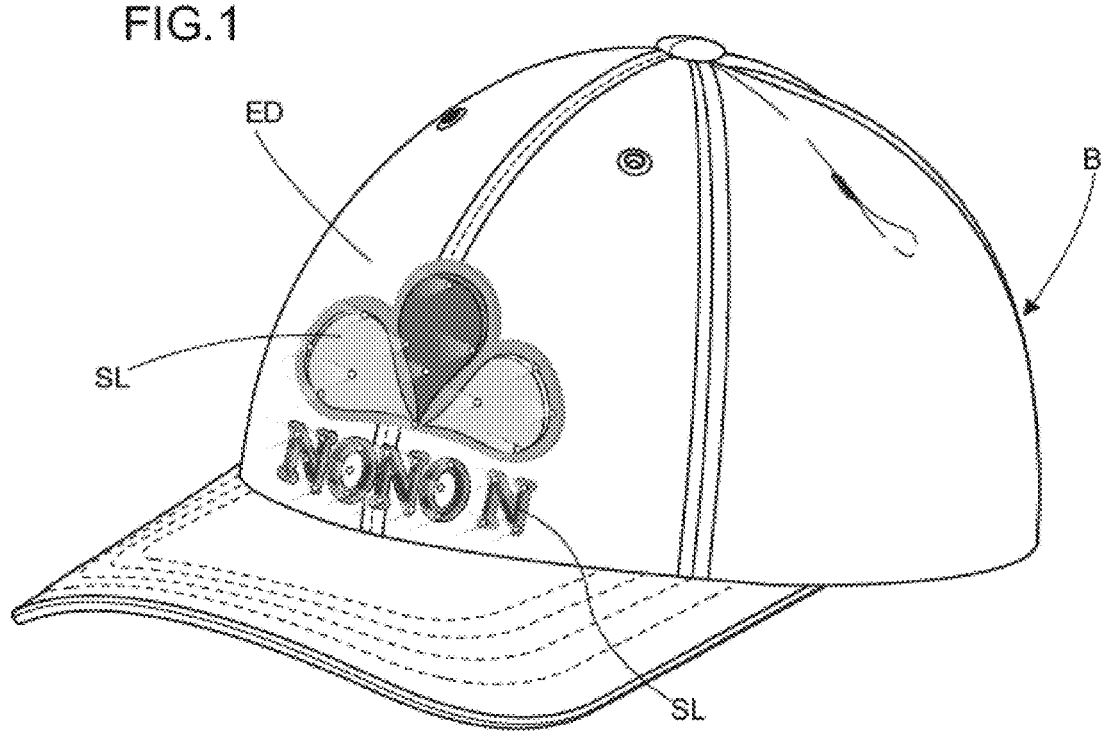
FIG. 1 represents a perspective view of a type of cap illustrating arrangement of a decorative element.

In an embodiment, the current invention includes "improvements introduced in a cap or a similar headwear provided with a luminous means incorporated in the decorative and/or in the promotional elements" more precisely it is related to a cap (B) formed by a crown (cp) and a brim (ab) whose outer surfaces might be provided with decorative elements (ED) of a type as logos, figures, inscriptions and the like, said decorative elements (ED) may be provided as an embroidery, silk-screen, metallic plates and others accompanied by luminous means (1); said luminous means (1) are configured by optical fiber filaments (F) illuminated by separate LEDs (L) or yet by a string of LEDs (L1), LED chips (L2) or the like; said luminous means in the form of optical fiber (F) make up a bunch (F1) coupled to a tubular shirt (4) that is provided with an end incorporated to said decorative elements (ED) and another end coupled to said LED (L) that, on its turn, is connected to an electrical circuit (CE) formed by a printed circuit board (5) and, at least, one 3.5 v or 12 v feeding battery (6) with an integrated command box (6A) provided with a switch bottom (b1); said switch might be placed in another site of easy access to the cap user as, for example, inserted into the lower surface of the cap brim (ab); said optical fiber filaments are incorporated to said decorative elements (ED), thus forming a partial or integral luminous surface (SL) in the cap (B) outer surface.

Figure 2:
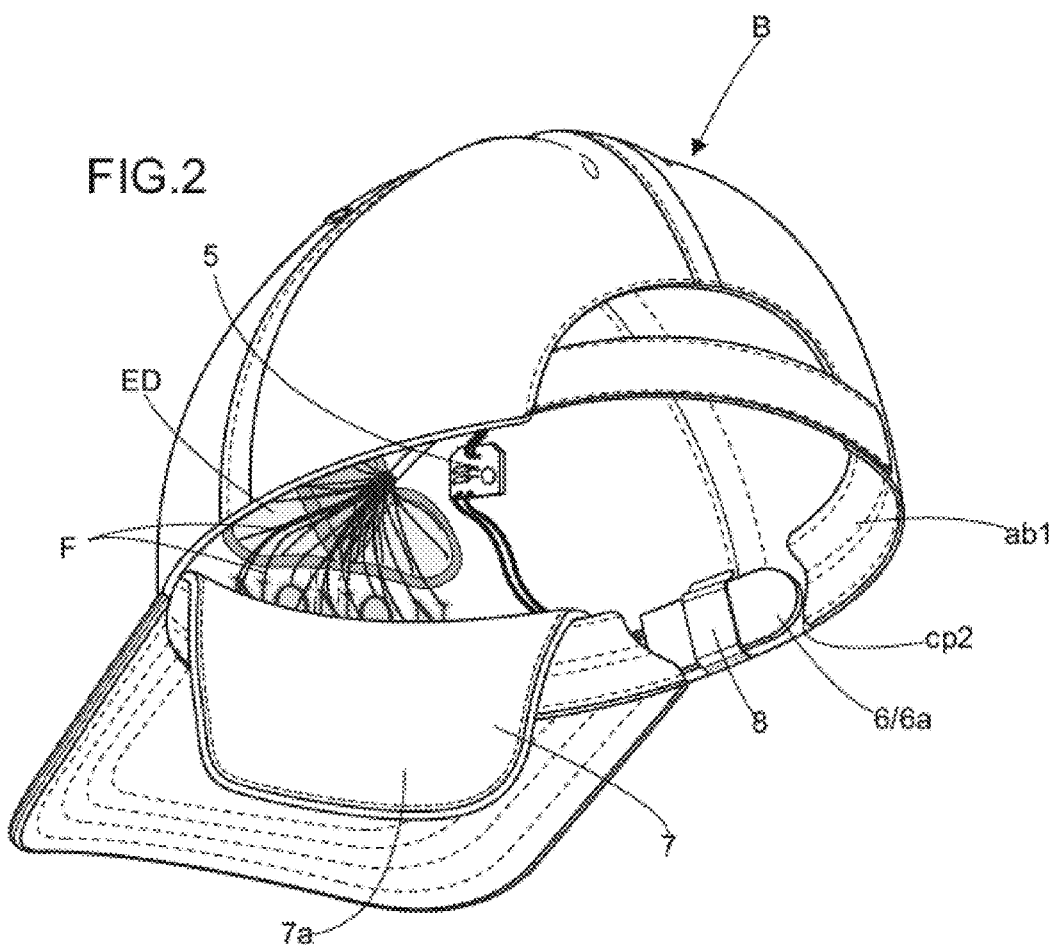
FIG. 2 reveals a lower perspective view illustrating multiple optical fiber filaments attached to a decorative element and also reveals an extended protective rim and a printed circuit board.
Figure 3:
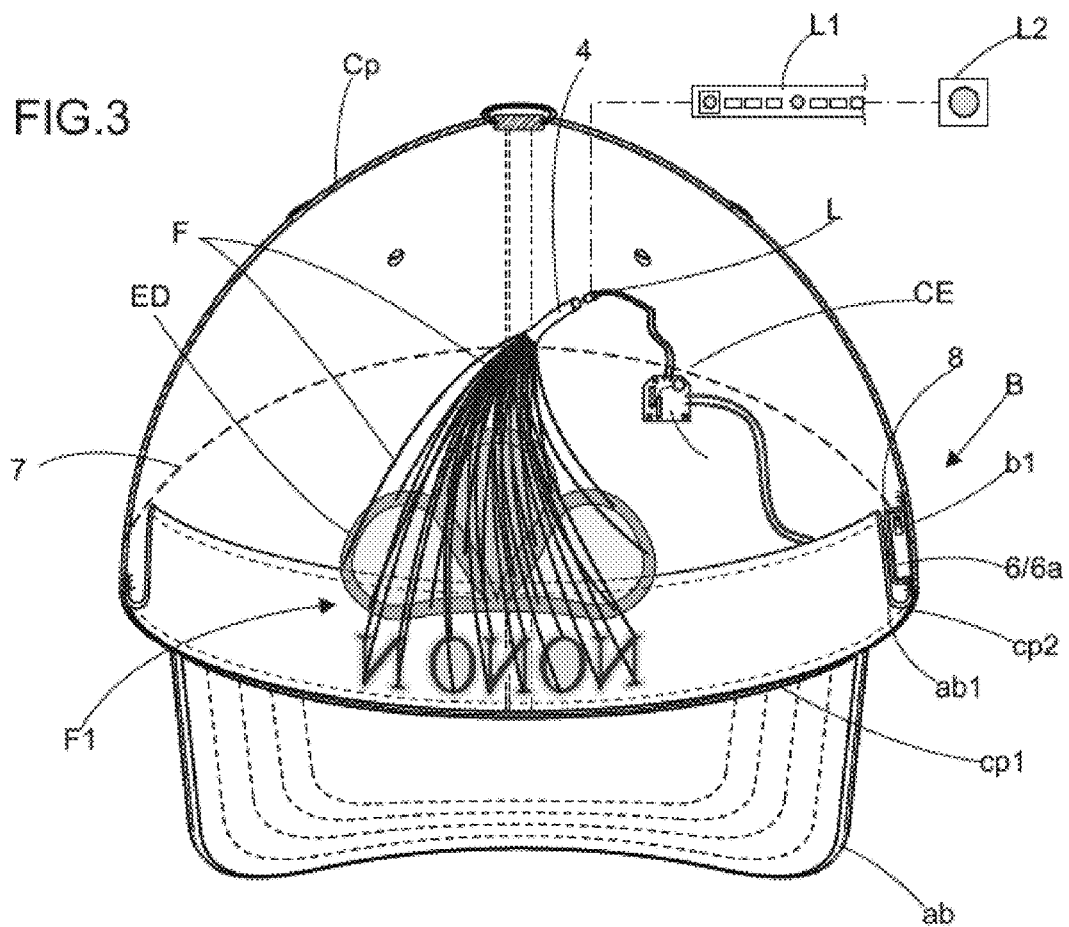
FIG. 3 illustrates a cross-sectional view of a cap showing assemblage of luminous means and electrical circuit and also an arrangement of optical fiber filaments in a decorative element.
Figure 4:
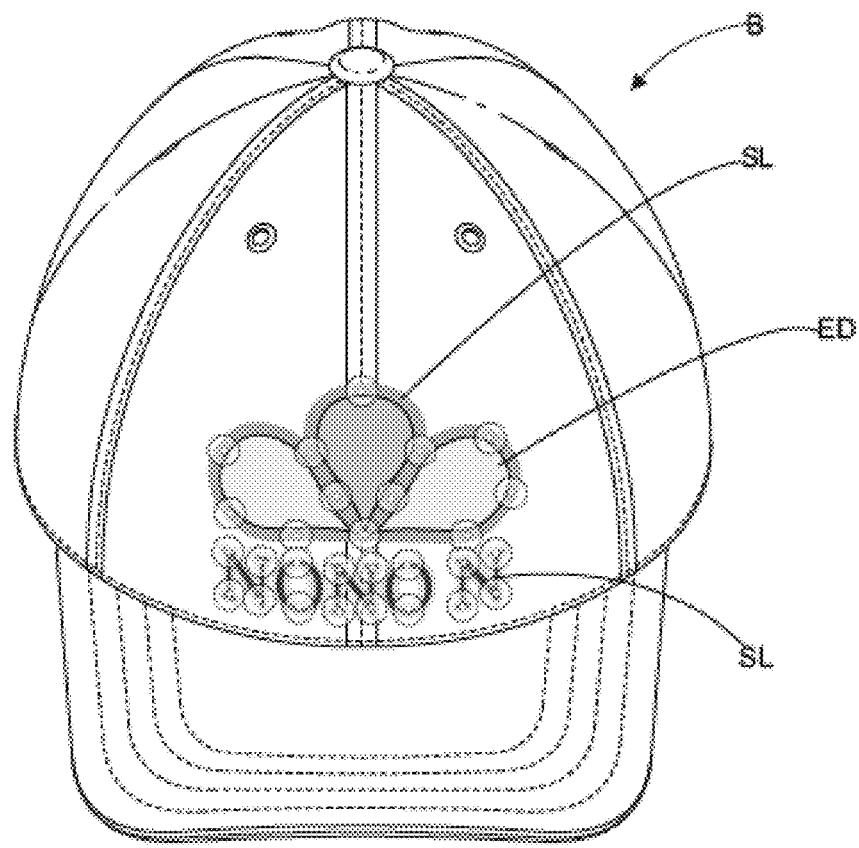
FIG. 4 illustrates a front view of a cap showing luminousness of a decorative element.
Figure 5:
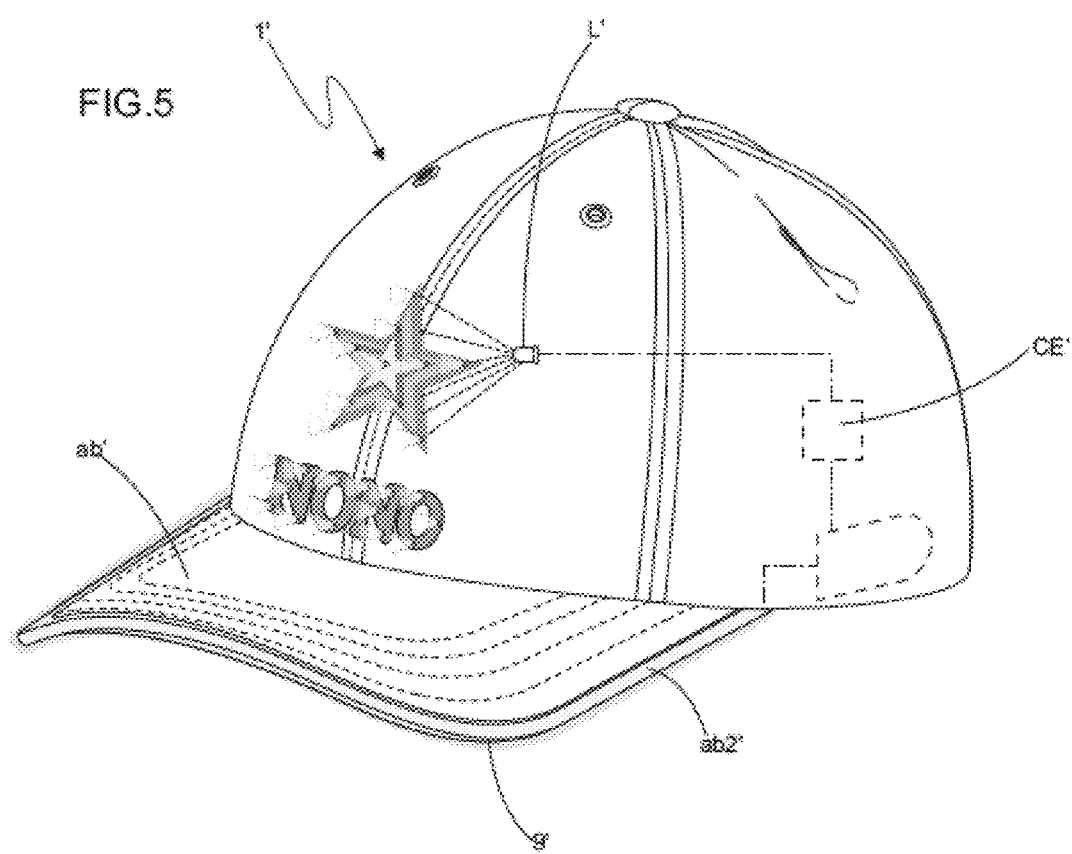
FIG. 5 represents a front perspective view of a type of cap illustrating a varied embodiment by way of arrangement of a luminous means at the peripheral edge of the brim and also a novel arrangement of optical fiber filaments in accordance with a decorative element.

As seen in FIGS. 1-5, the instant invention is related to "improvements introduced in a cap or a similar headwear provided with a luminous means incorporated in the decorative elements and or in the promotional elements", more precisely it is related to a cap (B) formed by a crown (cp) and a brim (ab) whose outer surfaces may be provided with decorative elements (ED) such as logos, figures, inscriptions and others, such decorative element (ED) may comprise an embroidery, silk-screen, metallic plates and other types of decoration that are provided together with luminous means (1).

In accordance with this invention the luminous means (1) are made of optical fiber filaments (F) illuminated by separate LEDs (L) or yet by a string of LED (L1), LED chips (L2) or the like. Luminous means in the form of optical fiber (F) make up a bunch (F1) coupled to a tubular shirt (4) which has an end incorporated to said decorative element (ED) and other end incorporated to said LED (L). On its turn said LED is connected to an electrical circuit (CE) formed by a printed circuit board (5) and at least one 3.5 v or 12 v feeding battery (6) with an integrated command box (6A) having a switch bottom (b1). Said switch might be located at some other site of easy access for the cap user as, for example, inserted into the lower surface of the cap (B) rim (AB).

Said optical fiber filaments are incorporated into the decorative element (ED) thus forming a partial or integral luminous surface (SL) in the outer surface of the cap (B).

In a preferred embodiment of the invention said command box (2) is programmed to issue lightening from said LEDs in the form of a constant light or in the form of distinct modes of light such as quick strobe, slow strobe, rhythm strobe and other modes.

Said luminous means (1) and said electrical circuit (CE) are placed under said decorative element (ED), especially in the inner side of the crown (cp). Said luminous mean (1) is covered by an extended brim (7) that is preferably manufactured as a foamed cloth (7a) which spreads out semi-circularly from the inner portion of the crown (cp) edge (cp1). Said battery and said command box (6)/(6A) are inserted at the side edge (cp2) of the crown (cp), especially between an inner peripheral brim (ab1) which is attached by an elastic ring (8).

By activation of the LED (L) provokes luminousness at a particular point of each filament (3). As each filament (3) is incorporated to such decorative element (ED) the whole luminousness of the cap (B) outer surface is obtained.

In a varied embodiment of the invention said luminous means (1) might be provided with a neon tube (9') applied at the edge (ab2') of the brim (ab'), said brim then connected to said electronic circuit (CE') so as to obtain a simultaneous lightening along with said LED (L').

It is certain that when this instant invention is put into practice changes might be made concerning to some embodiment details and form without, however, departing from the fundamental principles of the invention which are clearly supported by the set of claims. It is to be understood that the terminology employed herein has no intention to limit the invention.

What is claimed is:

1. A headwear apparatus, comprising:
   a cap (B) formed by a crown (cp) and brim (ab) whose outer surfaces are provided with decorative elements (ED) selected from the group consisting of logos, figures, inscriptions, and a combination thereof,
   a luminous means (1) accompanying said decorative elements (ED), said luminous means (1) configured by optical fiber filaments (F) illuminated by separate LEDs (L), by a string of LEDs (L1), or by LED chips (L2),
   said luminous means in the form of optical fiber (F) make up a bunch (F1) coupled to a tubular shirt (4) that is provided with an end incorporated to said decorative element (ED) and another end coupled to said LED (L) that is connected to an electrical circuit (CE) formed by a printed circuit board (5) and a power source (6) with an integrated command box (6A) provided with a switch bottom (b1),
   wherein said switch bottom is placed on a lower surface of the cap brim (ab),
   said optical fiber filaments incorporated to said decorative elements (ED), thus forming a partial or integral luminous surface (SL) in the cap (B) outer surface,
   said command box (2) programmed to issue lightening from said LEDs in the form of a constant light or a mode of lightening,
   said luminous means (1) and said electrical circuit (CE) located under said decorative element (ED) at the inner side of the cap crown (cp).

2. A headwear apparatus as in claim 1, wherein said luminous means (1) is covered by an extended brim (7) manufactured with a foamed cloth (7a) which extends semi-circularly from the inner portion of the crown (cp) edge (cp1) while said power source and said command box (6)/(6A) are located at the side edge (cp2) of the crown (cp) between the inner peripheral brim (ab1) that is fastened by an elastic ring (8).

3. A headwear apparatus as in claim 2, wherein said luminous means (1') contemplate a neon tube (9') applied at the brim (ab') edge (ab2') which is connected to said electronic circuit (CE') to provide simultaneous lightening with said LED (L').

4. A headwear apparatus as in claim 3, wherein said decorative element (ED) is partially or totally illuminated by the ends of said optical fiber filaments (F).

* * * * *